March 31, 1953 — F. D. MAHONEY — 2,633,386
COMBINATION NOZZLE, CHECK VALVE, AND STRAINER
Filed Feb. 18, 1950
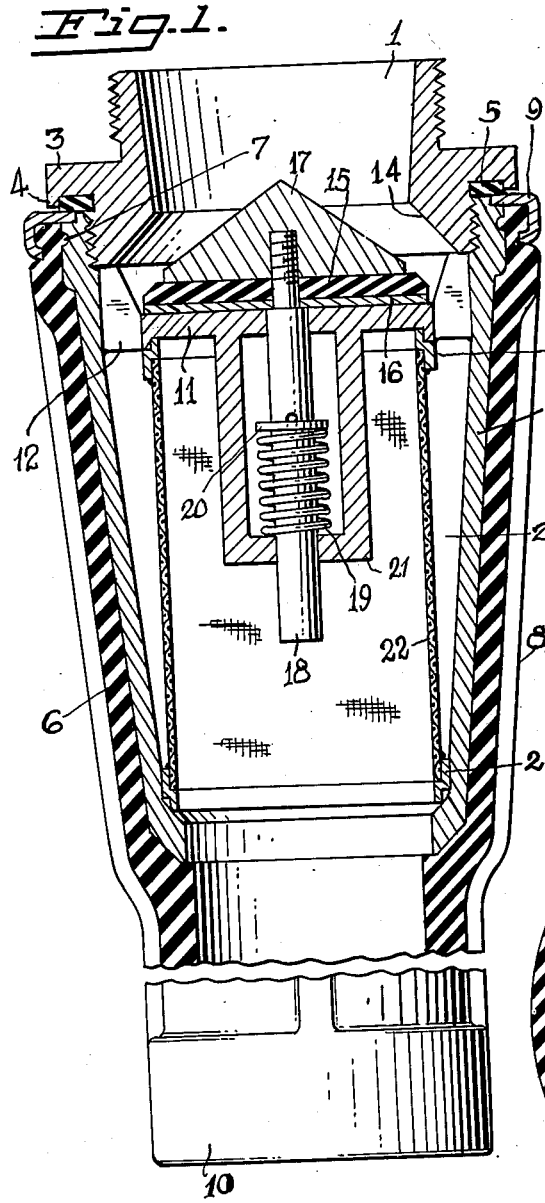
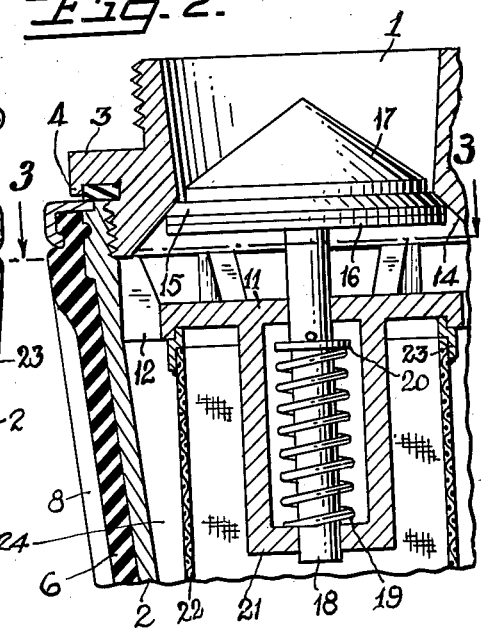
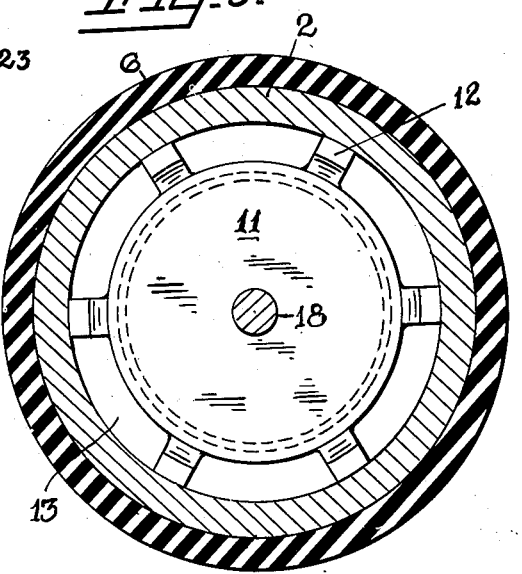
INVENTOR.
FRANK D. MAHONEY
BY
J. E. Grabman
ATTORNEY Patented Mar. 31, 1953

2,633,386

UNITED STATES PATENT OFFICE 2,633,386

COMBINATION NOZZLE, CHECK VALVE, AND STRAINER

Frank D. Mahoney, San Francisco, Calif.

Application February 18, 1950, Serial No. 145,072

4 Claims. (Cl. 299—150)

This invention relates to improvements in liquid controls and more particularly to a novel combination nozzle, check valve and strainer.

The present invention provides a novel combination nozzle, check valve and strainer which is adapted for use with liquid conduits, discharge spouts or the like to automatically control the flow of liquid therethrough. The nozzle is normally connected at its inlet end to a tubular member through which liquid under pressure is adapted to flow, and arranged in the nozzle is a check valve and strainer which cooperate to control the flow of liquid through the nozzle and to remove particles of foreign material therefrom. The check valve and strainer are so arranged in the nozzle that the valve when automatically opened by an increase in the pressure of the liquid entering the nozzle will divert the said liquid outwardly into an annular channel from whence it flows inwardly through the strainer to the outlet end of the said nozzle. The strainer may be readily detached from the nozzle for cleaning purposes after the latter is disconnected from the liquid conduit, spout or the like.

The primary object of my invention is to provide a novel combination nozzle, check valve and strainer which functions to automatically control the flow of liquid under pressure through the nozzle and to remove foreign particles of material therefrom.

For the purpose of this application I have elected to show herein certain forms and details of a combination nozzle, check valve and strainer representative of my invention. It is to be understood, however, that the embodiment of my invention herein shown and described is for the purpose of illustration only, and that therefore it is not to be regarded as exhaustive of the variations of the invention.

In the accompanying drawings:

Fig. 1 is a longitudinal sectional view of a combination nozzle, check valve and strainer, embodying my invention, showing the outlet end portion of the nozzle in elevation and the valve member in an open position;

Fig. 2 is a longitudinal sectional view of a portion of the combination showing the valve member in a closed position; and Fig. 3 is a sectional view taken on the line 3—3 of Fig. 2.

Referring to the drawings the numeral 1 designates an adaptor or union member having threaded portions at its opposite ends for the attachment of the discharge end of a tubular conduit, spout or the like (not shown) for supplying liquid under pressure and a tapered nozzle 2. The adaptor or union member 1 is formed with an annular flange 3 which is provided at its outer edge with a depending circular lip 4. A gasket 5 of neoprene or the like is arranged between the upper end of the tapered nozzle 2 and the annular flange 3 of the adaptor or union member 1, thereby normally preventing the escape of liquid through the threaded joint which connects the nozzle and the adaptor. The depending lip 4 formed on the annular flange 3 is arranged in engagement with the outer edge of the gasket 5, thereby providing means for confining the said gasket within the groove located between the said lip and the main body of the adaptor.

Fitting over and around the tapered nozzle 2 is a tapered tubular jacket 6 which is made preferably from static-conducting synthetic rubber. The upper end of the jacket is formed with an internal bead, as at 7, which snugly fits inside a suitable annular groove formed externally in the inlet or upper end portion of the nozzle 2. The jacket is preferably, although not necessarily, formed internally with a plurality of spaced longitudinal grooves which fit over similarly shaped protuberances (not shown) provided on the nozzle 2. The jacket is also preferably provided with external longitudinal protuberances 8 which are adapted to strengthen and increase the rigidity of the same. Secured between the inlet end of the nozzle 2 and the gasket 5, with its inner edge abutting an annular shoulder formed on the said nozzle, is a metal retaining ring 9 which is formed with a downwardly and inwardly bent outer edge portion which extends into an external annular groove provided in the jacket 6. The jacket 6 is formed with a cylindrical end portion 10 on which a closing cap (not shown) is adapted to fit.

Removably positioned inside the inlet end of the nozzle 2 is a valve supporting member 11 having a spider-like construction with radially disposed portions 12 which are spaced one from another to provide open liquid passages 13. The outer ends of the radial portions 12 are arranged in contacting relationship with the inner annular surface of the nozzle, thereby maintaining the valve supporting member 11 in a normally fixed position at the inlet end of the said nozzle. The lower end of the adaptor 1 is arranged to normally prevent the upward displacement of the member 11. The adaptor is formed at its lower end portion with an internally arranged tapered valve seat 14 with which a frustro-conical shaped valve disc or member 15, made of neoprene or other suitable material, is adapted to engage.

The valve member 15 is mounted between a rigid metal washer 16 and a conical shaped nut or valve head 17, the latter being secured by threaded means to a depending valve stem 18. The valve stem 18 is provided with a shoulder which engages with the washer 16, and by screwing the said stem into the nut the said valve member 15 is firmly clamped between the said washer and the nut. The valve member 15, being somewhat smaller in diameter than the valve supporting member 11, does not close the liquid passages 13 when in an open position as shown in Fig. 1.

Encircling the valve stem 18 is a coiled compression spring 19 which is confined between a fixed washer 20 secured to the said stem and the lower closed end of a depending cage 21 which is secured to the valve supporting member 11. The valve stem slidably extends through the lower closed end of the cage 21, and the spring 19 normally exerts a sufficient pressure in an upward direction on the valve stem to hold the valve member 15 in a closed position, engaging with the seat 14.

Supported inside the nozzle 2 beneath and in engagement with the valve supporting member 11 is a cylindrical wire mesh screen 22. The opposite ends of the screen are rigidly secured as by solder to end rings 23. The upper end ring 23 engages with a depending annular flange provided on the valve supporting member 11 and is thereby prevented from lateral displacement, while the lower end ring engages with the inwardly protruding end of the nozzle and is thereby prevented from lateral and downward displacement. Thus the screen 22 is normally held in a fixed position inside the nozzle. An annular chamber 24 is positioned between the screen 22 and the inner surface of the nozzle 2, the said chamber being in communication with the passages 13.

In operation, liquid under a predetermined minimum head pressure when admitted to the inlet end of the union member 1 forces the valve head 17 downwardly against the pressure in the opposite direction of the spring 19. As the valve member 15 becomes unseated the liquid is deflected outwardly and downwardly by the valve head through the passages 13 in the valve supporting member 11 and into the annular chamber 24. From the said chamber the liquid proceeds inwardly through the screen 22 and thence outwardly through the outlet end of the nozzle 2. It will be noted that the inner annular surfaces of the union member 1 tend to converge toward the valve head 17, thereby causing the downwardly flowing liquid to strike directly against the said valve head. Thus the liquid is deflected directly through the passages 13 without causing any appreciable loss of pressure. When the pressure of the liquid entering the union for any reason drops below the predetermined minimum required to overcome the pressure exerted in the opposite direction by the spring, the said spring automatically moves the unit comprising the valve stem 18, the washer 16, the valve head 17 and the valve member 15, upwardly until the said valve member again becomes seated against the valve seat 14. The liquid is thereby prevented from entering the nozzle until the pressure increases sufficiently to again overcome the pressure exerted in the opposite direction by the spring 19. The valve member 15 upon engaging with the seat 14 after the flow of liquid has been shut off by a valve or other device associated with the tubular conduit connected to the union member 1, prevents any liquid trapped in the said union member and its associated tubular conduit from leaking into the nozzle 2.

By unscrewing the union member 1 from the nozzle 2 the valve supporting member 11 and the various parts of the device connected thereto may be easily removed from the nozzle. The screen 22 being readily detachable from the valve supporting member may be cleaned in the usual manner.

It is to be understood that the annular chamber located between the screen and the inner surface of the nozzle may embody various shapes depending upon the relative forms and constructions of the nozzle and the strainer.

What I claim is:

1. In a combination nozzle, check valve and strainer, a tubular tapered nozzle having an inlet at its enlarged end and an outlet at its opposite smaller end, a union member detachably connected to the inlet end of the nozzle, an annular valve seat provided internally on the sides of the union member, a valve supporting member arranged across the interior of the conduit and having liquid passages at its outer edges in communication with the inlet, a valve member mounted in the nozzle on the supporting member and arranged to reciprocate between an open position adjacent the supporting member and a closed position engaging with the valve seat, the said valve member being adapted to be actuated to an open position by liquid entering the union member, a valve stem secured to the valve member and slidably extending through the supporting member, a yieldable compression spring normally maintaining the valve member in engagement with the valve seat, and a cylindrical screen mounted in the nozzle and having one end positioned against and closed by the valve supporting member and at its opposite end abutting the smaller end portion of the nozzle, the said screen having an outlet in communication with the outlet of the nozzle and the said screen forming the inner side of an annular chamber and the tapered sides of the nozzle the outer side thereof, and the said chamber being in communication with the inlet through the liquid passages and with the interior of the screen, whereby liquid may flow from the chamber through the screen to the outlet of the nozzle.

2. In a combination nozzle, check valve and strainer, a tubular tapered nozzle having an inlet at its enlarged end and an outlet at its smaller end, a union member detachably connected to the larger end of the nozzle, an annular valve seat on the inside of the union member, a detachable valve supporting member arranged across the interior of the inlet end portion of the nozzle and having liquid passages at its outer edges in communication with the inlet, a valve member mounted in the nozzle and arranged to reciprocate between an open position adjacent the detachable member and a closed position engaging with the valve seat, the said valve member being adapted to be actuated to an open position by liquid entering the union member, a spring means yieldably holding the valve member in its closed position, and a cylindrical screen mounted in the nozzle with one end thereof abutting and closed by the detachable member and at its opposite end abutting the smaller end portion of the nozzle, the said screen having its opposite end open and in communication with the outlet of the nozzle and the said screen forming the inner side of an annular chamber and the nozzle the outer side thereof, and the said chamber being in communication with the liquid passages in the detachable member.

3. In a combination nozzle, check valve and strainer, a tubular tapered nozzle having an inlet at its enlarged end and an outlet at its smaller end, a union member detachably connected to the larger end of the nozzle, the said union member having an annular valve seat on its inside surface, a removable valve supporting member arranged across the interior of the inlet end portion of the nozzle and having liquid passages at its outer edges in communication with the inlet, a valve member mounted in the nozzle on the said member and arranged to reciprocate between an open position adjacent the said member and a closed position engaging with the valve seat, the said valve member being adapted to be opened by liquid entering the union under a predetermined head pressure, spring means yieldably urging the valve member toward its closed position, a cylindrical screen mounted in the nozzle with one end abutting and closed by the said member and at its opposite end abutting the smaller end portion of the nozzle, the said screen having an outlet opening in its said opposite end in communication with the outlet of the nozzle and the said screen forming the inner side of an annular chamber and the nozzle the outer side thereof, and the said chamber being in communication with the liquid passages through the valve supporting member, and an outer flexible jacket covering extending around and over the nozzle.

4. In a combination nozzle, check valve and strainer, a tubular nozzle having an inlet at one end and an outlet at its opposite end, an annular valve seat arranged in the inlet end of the nozzle, a spider-like member arranged in the inlet end of the nozzle and having liquid passages adjacent its outer edge in communication with the inlet, a valve member supported on the spider-like member and arranged for reciprocating movement between a closed position seated against the valve seat and an open position, the said valve member having a conical head for diverting liquid coming into the nozzle when the valve member is in an open position through the passages, a substantially cylindrical screen arranged in the nozzle with one end abutting and closed by the spider-like member and having a substantial portion thereof in spaced relation to the nozzle, whereby an annular chamber is formed between the screen and the sides of the nozzle, the said screen having an outlet opening in its opposite end in communication with the outlet of the nozzle, the said chamber being in communication with the passages of the spider-like member.

FRANK D. MAHONEY.

REFERENCES CITED

The following references are of record in the file of this patent:

UNITED STATES PATENTS

| Number | Name | Date |
| --- | --- | --- |
| 86,158 | Houston | Jan. 26, 1869 |
| 1,116,094 | McVoy | Nov. 3, 1914 |
| 1,203,542 | Hawley | Oct. 31, 1916 |
| 1,721,092 | Saeger | July 16, 1929 |
| 1,982,228 | Murphy | Nov. 27, 1934 |
| 2,055,864 | Harsch | Sept. 29, 1936 |
| 2,126,440 | Apthorp | Aug. 9, 1938 |